(12) United States Patent
Sugita et al.

(10) Patent No.: US 11,733,721 B2
(45) Date of Patent: Aug. 22, 2023

(54) FLOW RATE CONTROL DEVICE AND FLOW RATE CONTROL METHOD

(71) Applicant: FUJIKIN INCORPORATED, Osaka (JP)

(72) Inventors: Katsuyuki Sugita, Osaka (JP); Kouji Nishino, Osaka (JP); Naofumi Yasumoto, Osaka (JP); Kaoru Hirata, Osaka (JP); Shinya Ogawa, Osaka (JP); Keisuke Ideguchi, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 398 days.

(21) Appl. No.: 16/970,278

(22) PCT Filed: Feb. 15, 2019

(86) PCT No.: PCT/JP2019/005638
§ 371 (c)(1),
(2) Date: Aug. 14, 2020

(87) PCT Pub. No.: WO2019/163676
PCT Pub. Date: Aug. 29, 2019

(65) Prior Publication Data
US 2021/0141399 A1   May 13, 2021

(30) Foreign Application Priority Data
Feb. 26, 2018   (JP) .................................. 2018-032604

(51) Int. Cl.
*G05D 7/06*   (2006.01)
*F16K 31/00*   (2006.01)
(Continued)

(52) U.S. Cl.
CPC ......... *G05D 7/0623* (2013.01); *F16K 31/004* (2013.01); *G05B 15/02* (2013.01); *G05D 7/0635* (2013.01); *G01F 1/363* (2013.01)

(58) Field of Classification Search
CPC ............ Y10T 137/7761; G05D 7/0623; G05D 7/0635; F16K 31/004; G05B 15/02; G01F 1/363
(Continued)

(56) References Cited

U.S. PATENT DOCUMENTS 5,054,650 A * 10/1991 Price .................... B05B 12/085
222/1
2001/0004903 A1* 6/2001 Ohmi .................. G05D 7/0664
137/613
(Continued)

FOREIGN PATENT DOCUMENTS

| JP | 2002-310773 A | 10/2002 |
| JP | 2004-138425 A | 5/2004 |
| JP | 2007-192269 A | 8/2007 |

OTHER PUBLICATIONS

International Search Report issued in PCT/JP2019/005638; dated Apr. 23, 2019.

*Primary Examiner* — William M McCalister
(74) *Attorney, Agent, or Firm* — Studebaker & Brackett PC (57) ABSTRACT

A flow rate control device 100 includes a control valve 6 provided in a flow path 1, a flow rate measurement unit 2, 3 for measuring fluid flow rate controlled by the control valve 6, and a controller 7. The controller 7 is configured so as to control the opening/closing operation of the control valve 6 to match the measurement integral flow rate based on the signal outputted from the flow rate measurement unit (Vn+Vd) to the target integral flow rate Vs.

7 Claims, 9 Drawing Sheets

(51) Int. Cl.
*G05B 15/02* (2006.01)
*G01F 1/36* (2006.01)

(58) Field of Classification Search
USPC .................................... 700/282; 137/487.5
See application file for complete search history.

(56) References Cited

U.S. PATENT DOCUMENTS

| | | | | |
|---|---|---|---|---|
| 2004/0015248 | A1* | 1/2004 | Tanaka | G05B 11/32 |
| | | | | 700/282 |
| 2006/0229794 | A1* | 10/2006 | Yasui | G05B 13/021 |
| | | | | 700/282 |
| 2010/0229967 | A1* | 9/2010 | Yasuda | G01F 25/10 |
| | | | | 137/486 |
| 2010/0294964 | A1 | 11/2010 | Matsumoto et al. | |
| 2011/0178644 | A1* | 7/2011 | Picton | E03B 7/071 |
| | | | | 700/282 |
| 2014/0083159 | A1* | 3/2014 | Nagai | G05D 7/00 |
| | | | | 73/1.34 |
| 2016/0033973 | A1* | 2/2016 | Takijiri | G05D 7/0635 |
| | | | | 700/282 |
| 2016/0282880 | A1* | 9/2016 | Nagase | G01F 1/50 |
| 2017/0160753 | A1* | 6/2017 | Paulig | G05D 7/0635 |
| 2017/0343402 | A1* | 11/2017 | Takijiri | F16K 37/005 |
| 2019/0094847 | A1* | 3/2019 | Nagase | G05B 23/0291 |
| 2020/0026311 | A1* | 1/2020 | Nagai | G01F 1/363 |

\* cited by examiner

FLOW RATE CONTROL DEVICE AND FLOW RATE CONTROL METHOD

TECHNICAL FIELD

The present invention relates to a flow rate control device and a flow rate control method, and more particularly, to a flow rate control device and a flow rate control method implemented in a semiconductor manufacturing equipment, a chemical plant, or the like.

BACKGROUND OF INVENTION

In semiconductor manufacturing equipment or chemical plants, in order to control the flow rate of fluid such as raw material gas or etching gas, various types of flow rate control devices are utilized. In such a flow rate control device to control the flow rates of various fluids with high accuracy, a control valve is controlled so as to eliminate the deviation between the flow rate measured by the flow rate measurement unit and a set flow rate. For example, a pressure-type flow rate control device is widely used, because it has a mechanism including a restriction part (e.g., orifice plate or critical nozzle) and a pressure sensor as a flow rate measurement unit, so that it is able to control the flow rate of various fluids with high accuracy. A pressure type flow rate control device is disclosed in, for example, Patent Document 1.

As the control valve for the pressure-type flow rate control device, a piezoelectric element-driven valve for opening/closing a diaphragm valve element by a piezo actuator is used. A piezoelectric element-driven valve is disclosed, for example, in Patent Document 2.

Recently, the pressure-type flow rate control device is required to be applied to ALD (Atomic Layer Deposition) process or the like, in such an application, it is required to open and close the control valve according to a high-speed (very short period) pulse-shaped set flow rate signal to control the flow rate.

PRIOR ART LITERATURES

Patent Literatures

Patent Document 1: Japanese Laid-Open Patent Publication No. 2004-138425
Patent Document 2: Japanese Laid-Open Patent Publication No. 2007-192269

SUMMARY OF INVENTION

Problems to be Solved by Invention

In an application for performing a pulsed flow rate control, the opening/closing operation of the valve faster than that of a conventional case is required. However, the inventors of the present application have found that the conventional flow rate control device has a limitation in increasing the response speed of opening/closing of the valve, and may not to suitably perform the pulsed flow rate control.

In particular, when a piezoelectric element driven valve is used as a control valve, a difference between the set flow rate and the actual flow rate in the rise and fall period occurs, due to the opening/closing of the valve by controlling the applied voltage to the piezoelectric element. Thus, a desired gas supply may not be performed by only controlling the applied voltage to the piezoelectric element in accordance with the pulse-shaped set flow rate signal. Furthermore, the responsivity of the control valve varies from device to device, in the conventional method, and the stabled pulse flow rate control may not be performed depending on the device.

The present invention has been made in view of the above-mentioned problems, and its main object is to provide a flow rate control device and a flow rate control method capable of suitably performing flow rate control even when pulse flow rate control is performed.

Means for Solving Problems

The flow rate control device according to an embodiment of the present invention includes a control valve provided in a flow path, a flow rate measurement unit for measuring the flow rate of a fluid controlled by the control valve, and a controller, which is configured to control the opening/closing operation of the control valve so as to match a measurement integral flow rate based on a signal output from the flow rate measurement unit to a target integral flow rate. The target integral flow rate, for example, is determined based on an input set flow rate signal.

In an embodiment, the controller includes a calculation unit for calculating the measurement integral flow rate based on the signal outputted from the flow rate measurement unit, a comparison unit for obtaining a difference between the measurement integral flow rate calculated by the calculation unit and the target integral flow rate, a valve operation control unit for starting the closing operation of the control valve when the difference obtained by the comparison unit is within a predetermined range.

In an embodiment, the calculation unit calculates the measurement integral flow rate by summing the integral flow rate calculated from the flow rate based on an signal outputted from the flow rate measurement unit at each elapsed time.

In an embodiment, the flow rate measurement unit is configured to output a flow rate value for each predetermined period, the controller includes: a calculation unit for calculating an arithmetic integral flow rate corresponding to the sum of the integral flow rate of the predetermined period, based on the flow rate value outputted from the flow rate measurement unit, a comparison unit for obtaining a difference between a value obtained by subtracting the known integral flow rate from the target integral flow rate, and the calculated integral flow rate obtained by the calculation unit, and a valve operation control unit for starting the closing operation of the control valve when the difference obtained from the comparison unit is within a predetermined range.

In an embodiment, the controller includes: a difference calculation unit for calculating an integrated flow rate difference that is the sum of the difference between an inputted set flow rate signal and the signal outputted from the flow rate measurement unit, a determination unit for determining whether or not the output from the difference calculation unit is a predetermined value or converged within a predetermined range, and a valve operation control unit for starting the closing operation of the control valve when the determination unit determines that the output of the difference calculation unit has converged.

In an embodiment, the measurement integral flow rate includes an arithmetic integral flow rate obtained from the signal outputted from the flow rate measurement unit, and a known integral flow rate in the flow rate fall period after closing the control valve, the controller is configured so as to start the closing of the control valve at a timing when the value obtained by subtracting the known integral flow rate from the target integral flow rate reaches the calculated integral flow rate.

In an embodiment, the flow rate measurement unit includes a restriction part provided downstream side of the control valve, and a pressure sensor for measuring the pressure between the control valve and the restriction part, the flow rate measurement unit is configured to measure the flow rate of the downstream side of the restriction part based on an output of the pressure sensor.

In an embodiment, the closing operation of the control valve is performed by a first order lag control.

In an embodiment, the control valve is a normally closed piezoelectric element driven valve.

In an embodiment, a continuous pulse signal of a rectangular wave is inputted to the controller as the set flow rate signal.

In an embodiment, the controller has a difference calculation unit for calculating the integral flow difference that is the sum of the difference between a ramp control signal which is outputted on the basis of the set flow rate signal as an internal command signal, and a signal outputted from the flow rate measurement unit, in the flow rate rise period, based on the output from the difference calculation unit, a slope in the lamp control signal is changed in the middle.

In an embodiment, the slope of the lamp control signal is changed from a first slope, that is the slope when the 100% flow rate at 500 msec, is reached, to a second slope, that is the slope when the 100% flow rate at 300 msec, is reached.

The flow rate control method according to the embodiments of the present invention is performed using a flow rate control device having a control valve provided in a flow path, and a flow rate measurement unit for measuring the flow rate of a fluid controlled by the control valve, the method includes a step of starting the closing of the control valve at a timing when an arithmetic integral flow rate, that is obtained from the signal outputted from the flow rate measurement unit, reaches to a value that is obtained by subtracting a known integral flow rate in the flow rate fall period after closing the control valve from a target integral flow rate.

Effect of Invention

According to the embodiments of the present invention, gas supply can be appropriately performed even when a pulsed flow rate control is performed.

BRIEF DESCRIPTION OF DRAWINGS

FIG. 3(a) is a diagram explaining the deviation between the set flow rate signal and a control flow rate signal, (b) is a diagram showing the relationship between a drive voltage of a piezoelectric element driven valve, and a displacement of a piezo actuator (stroke).

DETAILED DESCRIPTION OF INVENTION

Embodiments of the present invention will be described below with reference to the drawings, but the present invention is not limited to the following embodiments.

Figure 1:
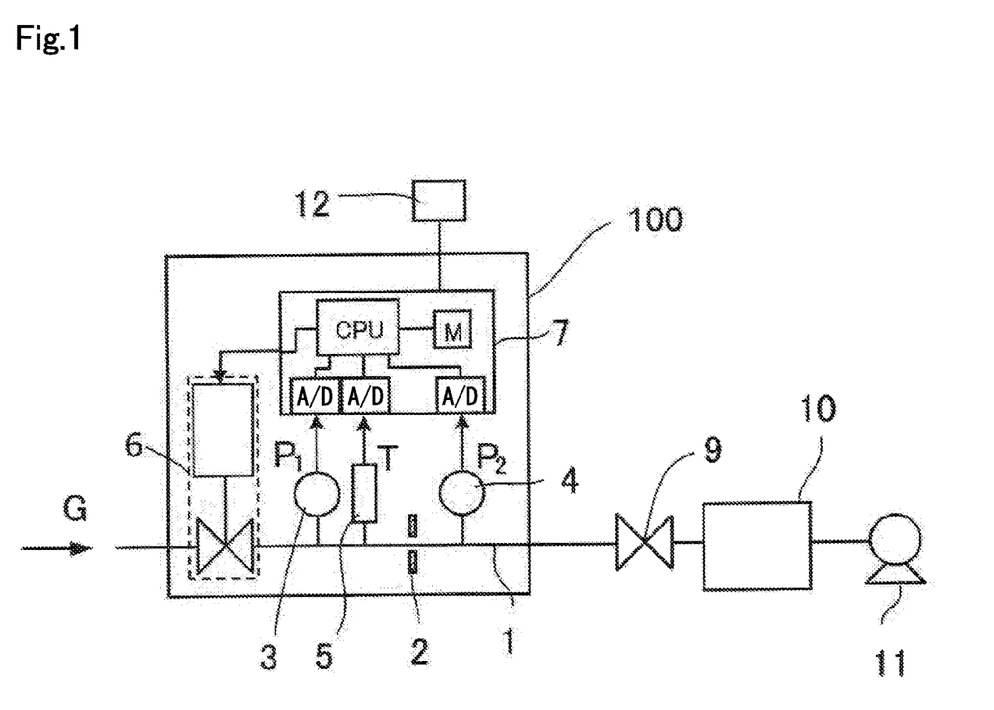
FIG. 1 is a schematic diagram showing a configuration of a pressure-type flow rate control device according to an embodiment of the present invention.

FIG. 1 shows a configuration of a flow rate control device 100 according to an embodiment of the present invention. The flow rate control device 100 is a pressure-type flow rate control device comprising: a restriction part 2 provided in a flow path 1 of a gas G supplied from a gas supply device, an upstream pressure sensor 3 and an temperature sensor 5 provided upstream side of the restriction part 2, a downstream pressure sensor 4 provided downstream side of the restriction part 2, and a control valve 6 provided upstream side of the upstream pressure sensor 3.

The upstream pressure sensor 3 can measure an upstream pressure $P_1$, which is the fluid pressure between the control valve 6 and the restriction part 2, and the downstream pressure sensor 4 can measure a downstream pressure $P_2$, which is the fluid pressure between the restriction part 2 and a downstream valve 9.

The flow rate control device 100 also includes a controller 7 for controlling the opening/closing operation of the control valve 6 based on outputs of the upstream pressure sensor 3 and the downstream pressure sensor 4, etc. The controller 7 is configured to compare a set flow rate received from an external control device 12 with an arithmetic flow rate obtained by calculation from the outputs of the upstream pressure sensor 3 and the downstream pressure sensor 4, and to control the control valve 6 so as the arithmetic flow rate approaching to the set flow rate.

Unlike the embodiment shown, the flow rate control device 100 may not include the downstream pressure sensor 4. In this case, the controller 7 is configured to calculate the flow rate based on the output of the upstream pressure sensor 3. Further, in certain embodiment, the controller 7 is configured to correct the arithmetic flow rate based on a fluid temperature detected by the temperature sensor 5.

The flow rate control device 100 may be provided with an inflow pressure sensor (not shown) for measuring the gas supply pressure on the upstream side of the control valve 6. The inflow pressure sensor can measure the pressure of a gas supplied from a connected gas supply device (such as a raw material vaporizer or a gas supply source), and can be used to control the gas supply amount or the gas supply pressure. The gas supplied from the gas supply device may be various types of gases, such as material gas, etching gas, or carrier gas.

As the restriction part 2, for example, an orifice plate can be used. Note that the "restriction part" is a portion in which the cross-sectional area of the flow path is formed smaller than the cross-sectional area of the front and rear flow path, although it can be configured using, for example, an orifice plate, a critical nozzle, a sonic nozzle, or the like, other may also be used. The aperture diameter of the orifice or the nozzle is set to 10 μm to 500 μm, for example.

As the downstream valve 9, a known Air Operated Valve or the like, in which the supply of compressed air is controlled by a solenoid valve, may be used. Furthermore, a conventional orifice built-in valve, in which an opening/closing valve is disposed in the vicinity of the orifice member, can be incorporated into the flow rate control device 100 as an integration of the restriction part 2 and the downstream valve 9.

In a fluid supply system including the flow rate control device 100, the downstream side of the restriction part 2 is connected to a process chamber 10 of the semiconductor manufacturing equipment via the downstream valve 9. A vacuum pump 11 is connected to the process chamber 10, and typically the interior of the process chamber 10 is evacuated by the vacuum pump 11 during gas supply.

The flow rate control device 100 described above can perform flow rate control using the principle that the flow rate is determined by the upstream pressure $P_1$ when the critical expansion condition $P_1/P_2 \geq$ about 2 (for argon gas) is satisfied. When the critical expansion condition is satisfied, the flow rate Q downstream side of the restriction part 2 is given by $Q=K_1 \cdot P_1$ (where $K_1$ is a constant depending on the fluid type and the fluid temperature), and the flow rate Q is proportional to the upstream pressure $P_1$. When the downstream pressure sensor 4 is provided, the flow rate can be calculated even when the difference between the upstream pressure $P_1$ and the downstream pressure $P_2$ is small, and the above critical expansion condition is not satisfied, and the flow rate Q can be obtained from $Q=K_2 \cdot P_2^m (P_1-P_2)^n$ (where $K_2$ is a constant depending on the fluid type and the fluid temperature, and m and n are exponents derived from the actual flow rate), based on the upstream pressure $P_1$ and the downstream pressure $P_2$ measured by the upstream pressure sensor 3 and the downstream pressure sensor 4.

To perform flow rate control, the set flow signal is sent from the external controller 12 to the controller 7. Based on the output or the like of the upstream pressure sensor 3, the controller 7 calculates the flow rate using the flow rate calculation formula in the critical expansion condition or the non-critical expansion condition from the above $Q=K_1 \cdot P_1$ or $Q=K_2 P_2^m (P_1-P_2)^n$, and feedback control the control valve 6 so that the flow rate of the fluid passing through the restriction part 2 reaches the set flow rate (i.e., so that the difference between the calculated flow rate and the set flow rate approaches 0). Calculated flow rate is outputted to the external control device 12 and displayed as a flow rate output value.

The controller 7 is typically incorporated in the flow rate control device 100, but it may also be provided outside the flow control device 100. The controller 7 typically comprises a CPU, a memory (storage device) M, such as a ROM or a RAM, an A/D converter, and the like, and may include a computer program for executing a flow rate control operation to be described later. The controller 7 is implemented by a combination of hardware and software. The controller 7 includes an interface for exchanging information with an external device such as a computer, and writing of program and data from the external device to the ROM is possible. Some of the components of the controller 7, such as the CPU, may be provided outside the device, and may be interconnected by wire or wirelessly between the inside of the device and the outside of the device.

Hereinafter, an embodiment of a pulse flow rate control performed by the flow rate control device 100 is described.

Figure 2:
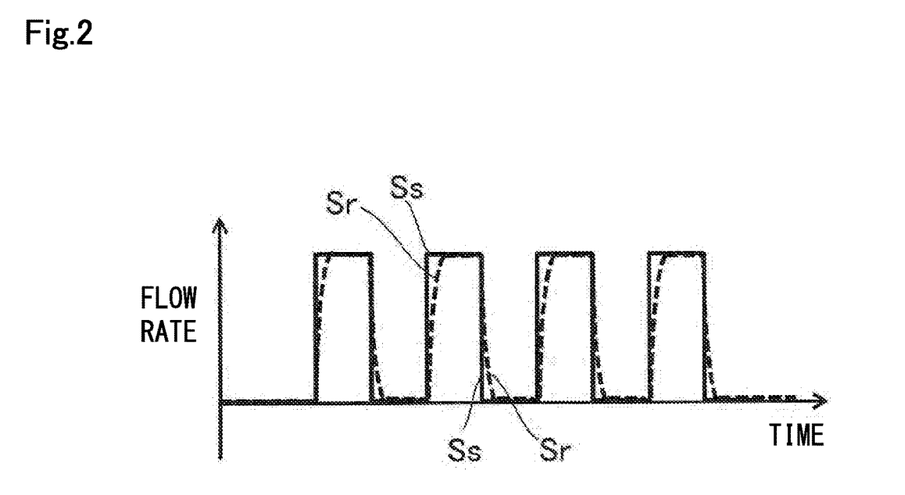
FIG. 2 is a diagram showing a set flow rate signal and a controlled flow rate signal.

FIG. 2 is a graph showing the set flow rate signal Ss, and a controlled flow rate signal Sr indicating the measured flow rate, when performing the pulse flow rate control. The set flow rate signal Ss is a control signal input from the outside to the flow rate control device 100, the control flow rate signal Sr is a signal indicating the controlled flow rate when performing the conventional operation of feedback control of the control valve 6 based on the upstream pressure $P_1$ according to the set flow rate signal Ss. The controlled flow rate signal Sr corresponds to the transition of the flow rate calculated from the upstream pressure $P_1$ measured by the upstream pressure sensor 3 provided as a flow rate measurement unit. The controlled flow rate signal Sr is a flow rate output signal from the controller 7 of the flow rate control device 100, for example.

As can be seen from FIG. 2, as the set flow rate signal Ss, the continuous pulse signal of the rectangular wave (e.g., pulse width 0.1 seconds to 60 seconds) is input, on the contrary, the rise of the controlled flow rate signal Sr increases over a certain amount of time. This is because when feedback control is performed, it is difficult to instantaneously open the control valve 6 to the opening degree corresponding to the set flow rate. Further, there is a problem that an overshoot would occur if the responsivity is further enhanced. Therefore, it actually becomes a curved rising operation as shown in FIG. 2.

Also, at the time of flow rate falling, the flow rate does not instantaneously decrease to 0, but decreases over a certain period of time. This is because that, in the pressure-type flow rate control device, since the gas flows through the restriction part 2 on the downstream side of the control valve 6, even after closing the control valve 6, so the residual gas between the control valve 6 and the restriction part 2 still flows out.

Therefore, in the pressure-type flow rate control device, even if the set flow rate signal Ss is input, the flow rate control is actually performed as the controlled flow rate signal Sr indicated. Further, it has been found that, even if the same set flow rate signal Ss is input, the controlled flow rate signal Sr is different, in accordance with the individual difference of the flow rate control device (specifically, such as the difference in the drive of the piezoelectric element or in the response characteristics of the valve).

Furthermore, particularly in the case when using a normally closed piezoelectric element driven valve as the control valve 6, at the time of rising from the flow rate 0%, there is a problem that a delay occurs in the valve opening operation.

Figure 3:
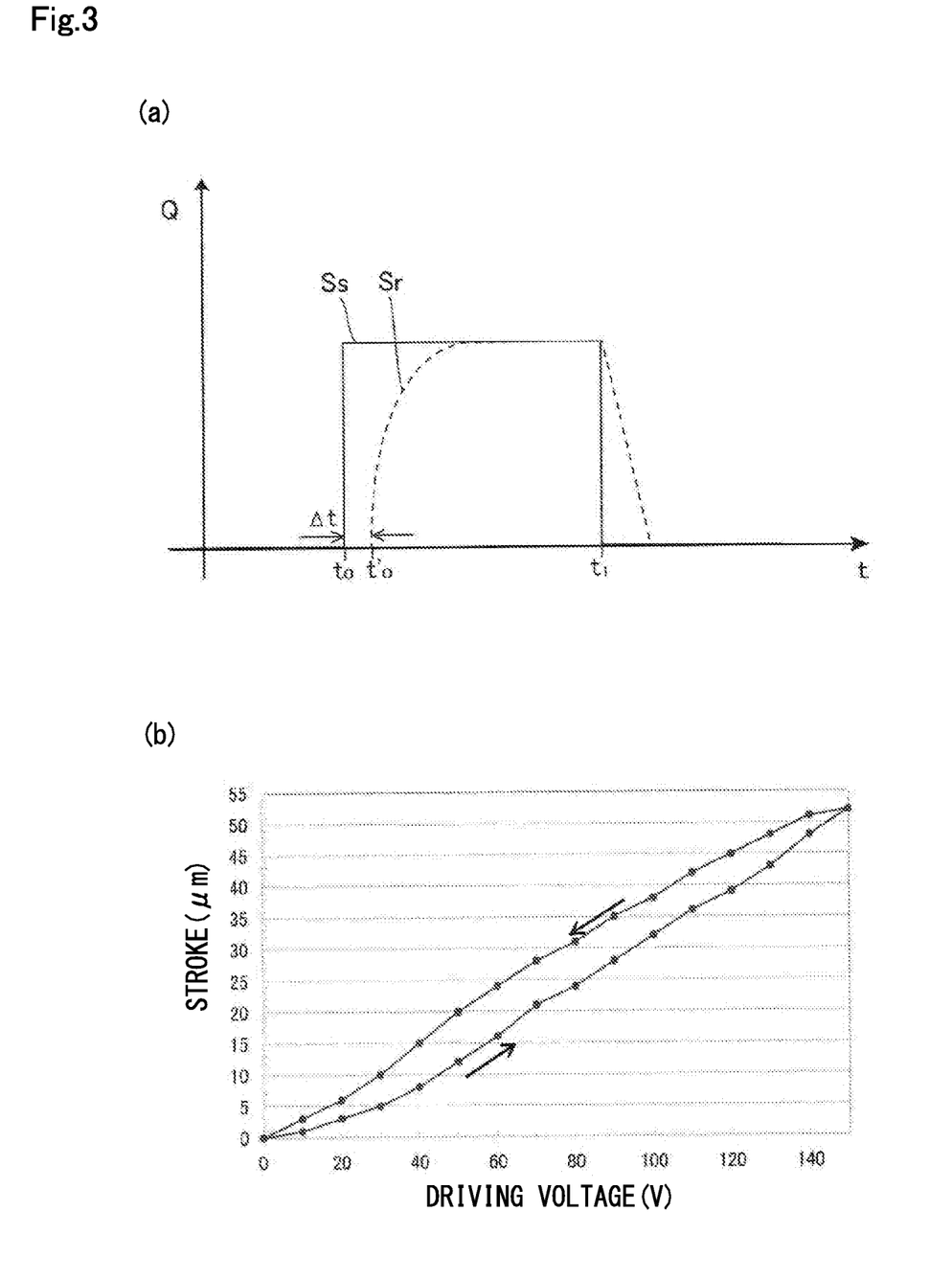

FIG. 3(a) shows the deviation between a set flow rate signal Ss and the controlled flow rate signal Sr, FIG. 3(b) shows the relationship between the driving voltage of the piezo actuator and the displacement of the piezo actuator (or sometimes referred to as a stroke). The displacement of the piezo actuator corresponds to the opening/closing degree of the valve.

As can be seen from FIG. 3(a), in the piezoelectric element driven valve, the valve is opened at time $t_0'$ after the rising time $t_0$ of the set flow rate signal Ss, a delay time $\Delta t$ occurs. The reason of the occurrence of such a delay time is because that the valve element is pressed against the valve seat when a voltage is not applied in the closed state in the normally closed type valve, so the valve element does not move immediately after applying a voltage, but start moving until a certain magnitude of voltage is applied. Especially when a small voltage is applied, since the force acting in the direction of contracting the piezoelectric element is larger, sometimes the piezoelectric element hardly extends. Furthermore, since the piezo actuator and the valve element are connected via various mechanical mechanisms, so the response may be reduced by the play of the mechanical mechanism.

Further, as shown in FIG. 3(b), in the normally closed type piezoelectric element driven valve, the rising time when increasing the applied voltage, and the falling time when reducing the applied voltage, the relationship between the driving voltage and the displacement of the piezo actuator is different. Then, it can be seen that during the period from when no voltage is applied until a relatively small voltage is applied, the displacement of the piezo actuator is small, it is not easy to control it to immediately open the valve to the desired opening.

As can be seen from the above description, it is very difficult to control the opening/closing operation of the valve to completely match the set flow rate signal Ss, then, when performing the pulse flow rate control, since the deviation between the set flow rate signal Ss and the controlled flow rate signal Sr in the flow rate rise period and the flow rate fall period occurs frequently, it is difficult to supply the desired gas amount, i.e. the desired integrated flow rate. Further, in applications where pulsed gas supply, such as ALD, is required, it is important to perform not only the control of the magnitude of the flow rate, but also the control of the integrated flow rate per pulse. Note that the integral flow rate described here is a total flow rate (volume) value supplied when gas is supplied at a specific flow rate for a specific time period.

Therefore, in the flow rate control device 100 of the present embodiment, the measurement integral flow rate (i.e., the volume of the gas actually supplied) is obtained based on the signal outputted from the flow rate measurement unit (here the signal of the flow rate calculated based on the pressure outputted from the upstream pressure sensor 3). Then, the opening/closing operation of the control valve 6 is controlled so as to match the measurement integral flow rate to the target integral flow rate based on the input set flow rate signal Ss. Thus, the amount of supplied gas (volume), and the gas amount according to the set flow rate signal Ss (volume) are equivalent, to enable appropriate performance of gas supply.

That is, in the embodiment of the present invention, although the rising time $t_0$ and falling time $t_1$ determined by the pulse-shaped set flow rate signal Ss differ from the rising time $t_0$ 'and falling time $t_1$' when gas is actually supplied, rather than performing the opening/closing of the valve exactly at the set time, the predetermined gas volume (integral flow rate) to be supplied by the pulse supply (pulse waveform) is considered more important, so the opening/closing control of the valve is performed to enable supplying of the desired integral flow rate.

Hereinafter, a specific pulse flow rate control operation in the present embodiment will be described.

Figure 4:
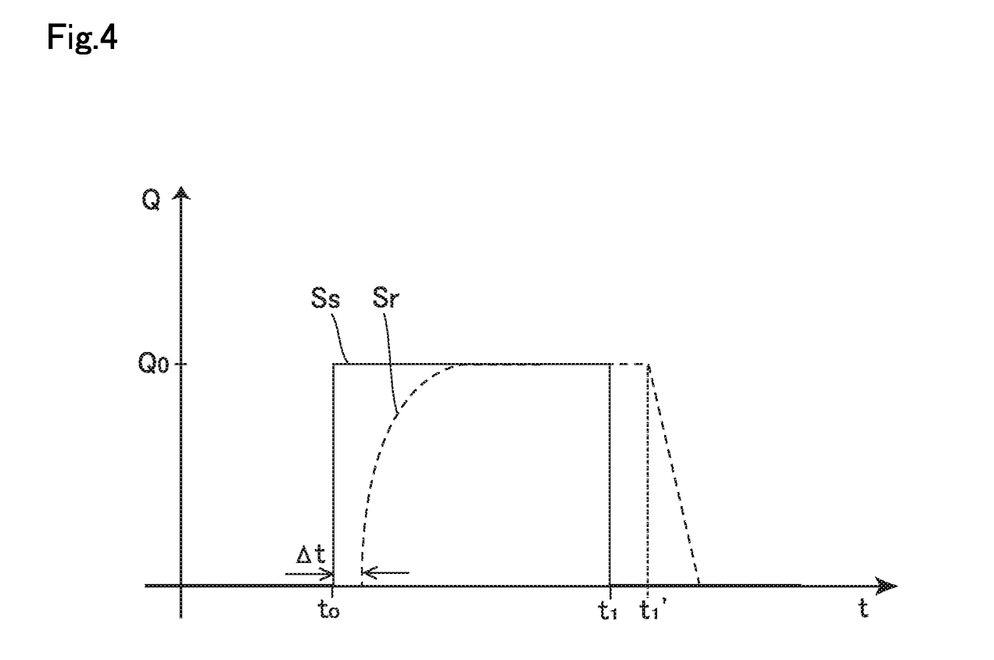
FIG. 4 is a diagram explaining the operation of a pulse flow rate control in an embodiment of the present invention.
Figure 5:
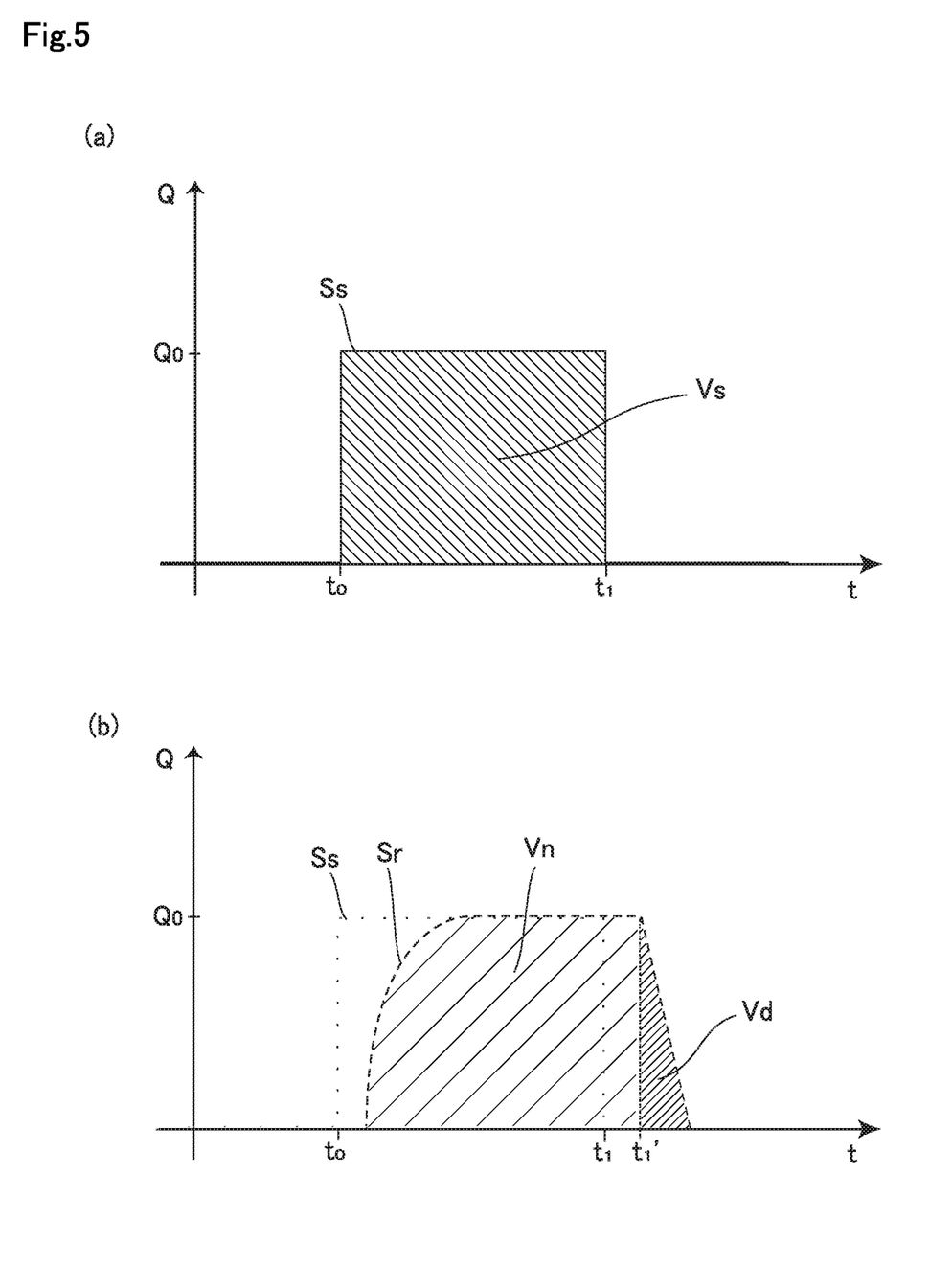
FIG. 5 is a diagram explaining the signal shown in FIG. 4, where (a) shows a target integrated flow rate based on the set flow rate signal, and (b) shows an arithmetic integral flow rate and a known integral flow rate.

FIGS. 4 and 5 are diagrams showing an input set flow rate signal Ss, and a controlled flow rate signal Sr in the present embodiment. As can be seen from FIG. 4, in the present embodiment, even when the start of flow rate delays by the delay time $\Delta t$ after the input of the set flow rate signal Ss, the timing of starting the valve closing is delayed after the fall time $t_1$ of the set flow rate signal Ss, so that the measured accumulated flow rate is controlled to be in accordance with the set flow rate signal Ss.

To perform such an operation, first, the target integrated flow rate Vs is obtained based on the set flow rate signal Ss. As shown in FIG. 5(a), the target integrated flow rate Vs can be obtained by $Vs=Q_0 \times (t_1-t_0)$. Here, $Q_0$ is the set flow rate, $t_0$ is the start time of the valve opening in the set flow rate signal Ss, and $t_1$ is start time of the valve closing in the set flow rate signal Ss. However, the target integrated flow rate Vs may also be provided in advance.

On the other hand, based on the signal output from the flow rate measurement unit, the measured integral flow rate corresponding to the gas volume actually supplied can be obtains. However, in the present embodiment, the case when the known integral flow rate Vd is known in advance, which is the integral flow rate of the gas flowing after the valve start closing, will be described.

In this specification, "the measured integral flow rate" may be based on the integral flow rate obtained from the signal output from the flow rate measurement unit (e.g., the calculated integral flow rate to be described later), other integral flow rate (e.g., the known integral flow rate Vd obtained without performing the flow rate measurement) may also be included. The "measured integrated flow rate" may be determined in any manner as long as it corresponds to the volume of gas actually supplied (actual integrated flow rate).

Here, the known integrated flow rate Vd will be described. The integral flow rate of the gas flowing after the start of the valve closing can be controlled substantially constant by appropriately performing the valve control at the time of valve closing. When the valve is closed, mainly, the residual gas between the control valve 6 and the restriction part 2 will flow out, in the embodiment shown in FIG. 4, by lamp control of the control valve 6, a constant flow rate fall characteristics can be obtained regardless of the device. In this way, since the integral flow rate of the flow rate fall period (i.e., the period from the start of the valve closing operation, until the valve is completely closed) can be stabilized, it can be stored in advance in the memory as a known integrated flow rate Vd.

Since the magnitude of the known integrated flow rate Vd varies depending on the set flow rate $Q_0$, it may be stored in the memory for each set flow rate $Q_0$, or may be defined as a function of the set flow rate $Q_0$. In either case, typically an appropriate known integrated flow rate Vd corresponding to the set flow rate $Q_0$ is used. In the present specification, the known integrated flow rate Vd means an integrated flow rate, which can be known without using the flow rate measurement by the flow rate measurement unit when obtaining the above-mentioned measured integrated flow rate, and it is typically known in advance before the flow rate measurement. However, the known integrated flow rate Vd may also be obtained by calculation or input from a storage device during flow rate measurement. Further, the known integral flow rate Vd may be measured in advance using the flow rate measurement unit provided in the flow rate control device of the present embodiment, and stored in the storage device before obtaining the above measured integral flow rate.

If the known integral flow rate Vd is given as described above, the measured integral flow rate, as shown in FIG.

5(b), can be defined by the sum of the known integral flow rate Vd, and the arithmetic integral flow rate Vn until the start of the valve closing.

The arithmetic integral flow rate Vn can be obtained according to $Vn=\Sigma Q_t \times tx=(Q_{t0}+Q_{t0+tx}+Q_{t0+2tx}+ \ldots + Q_{t0+ntx}) \times tx$. Here, Qt is the flow rate at time t, tx is the flow rate calculation period, n is a natural number. The flow rate calculation period tx is set, for example, 0.5 milliseconds to 5 milliseconds, the flow rate calculation is performed for each flow rate calculation period tx. Further, the flow rate Qt at time t, for example, can be determined by calculation according to the above $Q=K_1 \cdot P_1$ from the output of the upstream pressure sensor 3 at time t (upstream pressure $P_1$).

Thus, when the flow rate measurement unit outputs the flow rate value for each predetermined time (flow rate calculation period), the arithmetic integral flow rate Vn is obtained from the sum of the integral flow rate by repeating the addition of the integral flow rate within a predetermined time obtained from the output flow rate value, the period from time $t_0$ until the valve is actually opened shows a value of substantially 0, then increases with the passage of time.

Then, when the sum of the arithmetic integral flow rate Vn and the known integral flow rate Vd of the flow rate fall period reaches the target integral flow rate Vs at the time of t1', i.e., the arithmetic integral flow rate Vn reaches the value (Vs−Vd) obtained by subtraction of the known integral flow rate Vd from the target integral flow rate Vs at the time of time t1', start closing control valve 6 at the time of t1'. The time t1' is typically the time after the start time t1 of the valve closing according to the set flow rate signal Ss (fall time), however, depending on the magnitude of the known integrated flow rate Vd, it may be a time before the start time t1 of the valve closing.

As described above, by determining the start timing of closing the control valve 6, since it is possible to match the measurement integral flow rate (Vn+Vd) to the target integral flow rate Vs, even when performing the pulse flow rate control, performance of suppling the desired gas amount becomes possible. Further, even when the flow rate rise characteristics varies depending on the flow rate control device, since the closing timing of the control valve is determined on the basis of the measured integral flow rate obtained by calculation from the output of the flow rate measurement unit (here upstream pressure sensor), it is possible to perform appropriate pulse flow rate control, regardless of the device. Further, in the present embodiment, since it is possible to perform the flow rate control in real time based on the output of the flow rate measurement unit, even when excessive supply and unexpected sudden flow rate change or the like, such as overshoot, occurs, it is possible to match the measured integral flow rate to the target integral flow rate to suitably perform the flow control.

Hereinafter, with reference to FIGS. 6 and 7, a specific example of the configuration and control flow of the controller 70 for performing the flow rate control operation of the present embodiment will be described. The controller 70 shown in FIG. 6 may be included in the interior of the controller 7 provided in the flow rate control device 100 shown in FIG. 1 (the controller configured to perform the flow rate control by feedback control of the control valve 6 based on the input of the upstream pressure sensor 3), it may also be provided separately from the controller 7 shown in FIG. 1. Of course, all or a portion of the components of the controller 70 may be provided outside the controller 7 or the flow rate control device 100.

Figure 6:
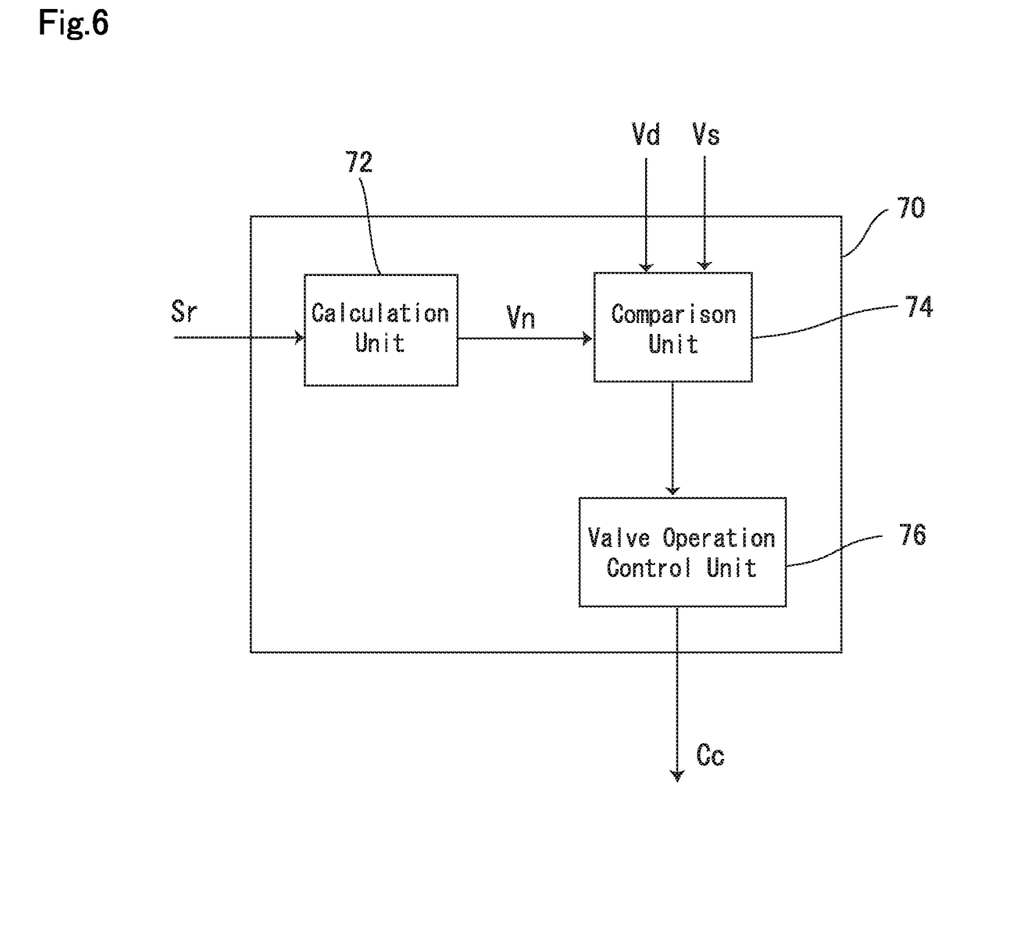
FIG. 6 is a block diagram showing an exemplary configuration of a controller for performing the operation of a pulse flow rate control in an embodiment of the present invention.

FIG. 6 is a block diagram showing a configuration example of the controller 70. As shown in FIG. 6, the controller 70 includes: a calculation unit 72 for calculating the arithmetic integral flow rate Vn corresponding to the sum of the integration flow rate based on the flow rate value output from the flow rate measurement unit, a comparison unit 74 for determining the difference between the value obtained by subtracting the known integral flow rate Vd from the target integration flow rate Vs and the arithmetic integration flow rate Vn calculated in the calculation unit 72, and a valve operation control unit 76 for outputting the closing command Cc to start the closing operation of the control valve 6, when the difference ((Vs−Vd)−Vn) obtained in the comparison unit 74 is within a predetermined range.

Figure 7:
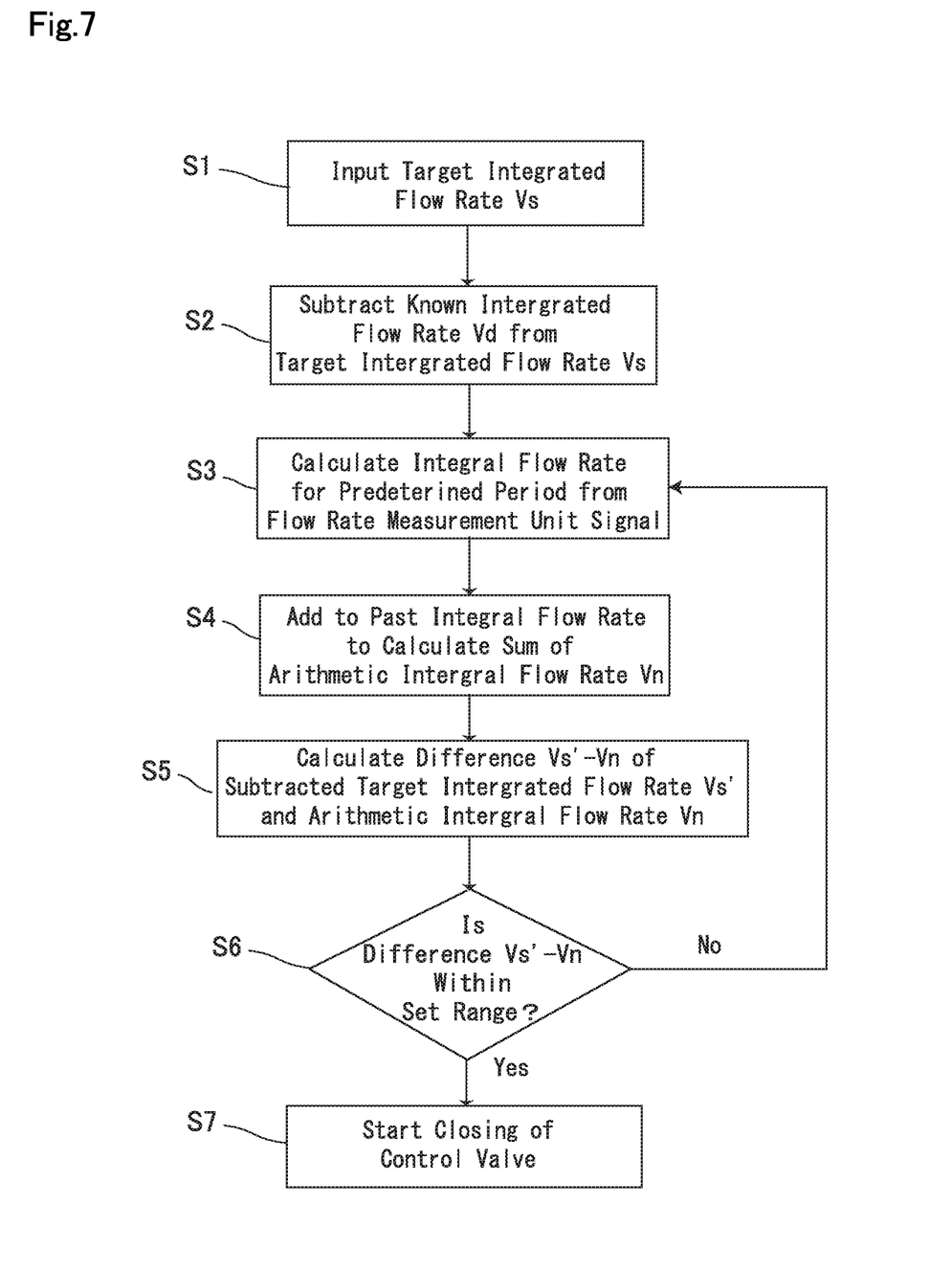
FIG. 7 is flowchart showing an exemplary control of an operation of the pulse flow rate control in an embodiment of the present invention.

To describe the control flow more specifically, in the controller 70, as shown in step S1 in FIG. 7, the target integrated flow rate Vs is input to the comparison unit 74 of the controller 70. The known integrated flow rate Vd is also input to the comparison unit 74.

Next, as shown in step S2, in the comparing unit 74, the target integrated flow rate Vs' after subtraction can be obtained by subtracting the known integrated flow rate Vd from the target integrated flow rate Vs (=Vs−Vd). In addition, if the target integrated flow rate Vs and the known integrated flow rate Vd are known in advance, the target integrated flow rate Vs' after subtraction may be input from the beginning to the comparison unit 74. Further, when obtaining the target integral flow rate Vs from the input set flow rate signal Ss, the target integral flow rate Vs may be calculated waiting for the falling of one pulse of the set flow rate signal Ss, step S1 and step S2 can be performed in parallel with the step of obtaining the integrated flow rate Vn in the calculation unit 72 to be described below.

On the other hand, after the opening command is issued to the control valve 6 according to the input set flow rate signal Ss, in the calculation unit 72 of the controller 70, as shown in step S3, based on the signal of the flow rate measurement unit (controlled flow rate signal Sr), the integral flow rate Qt·tx of a predetermined minute period (here the flow rate calculation period tx) is calculated.

Next, as shown in step S4, by adding the integral flow rate obtained in step S3 to the total value of the past integral flow rates, the sum of the arithmetic integral flow rate Vn is calculated. The calculated integrated flow rate Vn is sent from the calculation unit 72 of the controller 70 to the comparison unit 74.

Next, as shown in step S5, in the comparison unit 74, the difference Vs'−Vn between the target integrated flow rate Vs' after subtraction and the arithmetic integral flow rate Vn is calculated, as shown in step S6, whether or not the calculated difference Vs'−Vn is within the set range is determined. Here, the set range is set in a range capable of determining whether the target integral flow rate Vs' after subtraction and the arithmetic integral flow rate Vn is substantially the same, typically, the range is set to the same degree of the 0 centered output error range of the flow meter.

In step S6, when it is determined that the difference Vs'−Vn is not within the set range (No), it is determined that the arithmetic integrated flow rate Vn did not reach the integrated flow rate which it is supposed to reach, the flow returns to step S3 without starting the closing operation of the control valve 6. Then, by adding the integrated flow rate obtained from the control flow rate signal Sr in step S3 to the sum integrated flow rate up to the previous time in step S4, to calculate the updated arithmetic integral flow rate Vn. Further, in step S5, the difference between the target integrated flow rate Vs' after subtraction and the updated arithmetic integral flow rate Vn is calculated. This series of operations is repeated until it is determined in S6 that the difference Vs'−Vn is within the set range, and during this period, the gas continues to flow through the control valve 6.

Then, in step S6, when the difference Vs'−Vn between the target integral flow rate Vs' after subtraction and the arithmetic integral flow rate Vn is determined to be within the set range, it is determined that the arithmetic integral flow rate Vn and the target integral flow rate Vs' after subtraction became substantially the same, the comparison unit 74 instructs the valve operation control unit 76 to output a closing command Cc to the control valve 6. As shown in step S7, when the valve operation control unit 76 receives the instruction, then it outputs a closing command Cc to the control valve 6 for starting the closing operation of the control valve 6.

Thereafter, the control valve 6 is completely closed while flowing out the amount of gas corresponding to the known integrated flow rate Vd in the flow rate fall period, since the measured integral flow rate Vn+Vd is consistent with the target integral flow rate Vs, the desired gas amount of gas can be supplied.

Figure 8:
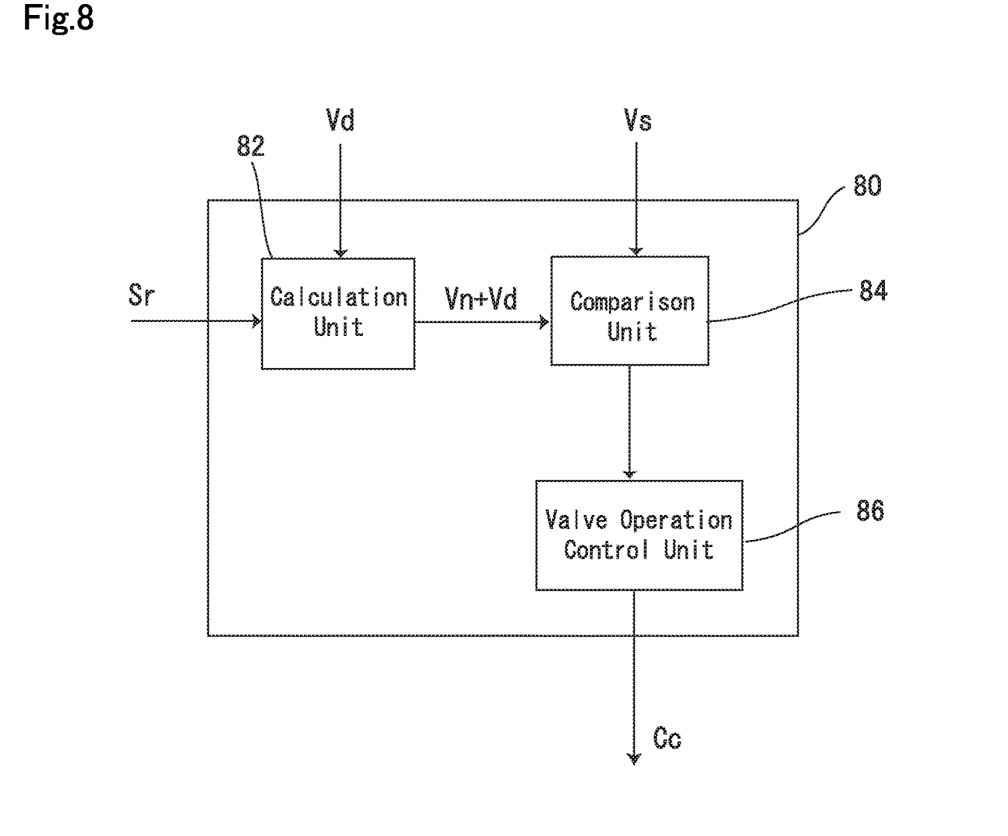
FIG. 8 is a block diagram showing an exemplary configuration of a controller for performing an operation of the pulse flow rate control in an embodiment of the present invention.

The controller 70 in one embodiment has been described above. However, as shown in FIG. 8, a controller 80 in another embodiment includes: a calculation unit 82 for calculating the measured integrated flow rate Vn+Vd by adding the calculated integrated flow rate Vn corresponding to the total sum of the integrated flow rates based on the flow rate value outputted from the flow rate measurement unit and the input known integrated flow rate Vd, a comparison unit 84 for calculating the difference between the target integrated flow rate Vs and the measured integrated flow rate Vn+Vd calculated by the calculation unit 82, and a valve operation control unit 86 for outputting a closing command Cc to start the closing operation of the control valve 6 when the difference (Vs−(Vn+Vd)) calculated by the comparison unit 84 becomes within a set range. Even using the controller 80, similarly to the controller 70, in order to match the measurement integrated flow rate Vn+Vd with the target integrated flow rate Vs, the start timing of the closing operation of the control valve 6 can be controlled.

There is no need to say that a storage unit for storing the integrated flow rate obtained by integrating, and the target integrated flow rate obtained from outside may be provided in the controllers 70 and 80 described above. The storage unit may also be provided outside the controllers 70, 80, or the flow rate control device 100. In addition, the target integrated flow rate and the known integrated flow rate may be previously stored in the storage unit as data, or may be input to the storage unit at an arbitrary timing before the valve closing command is output.

Figure 9:
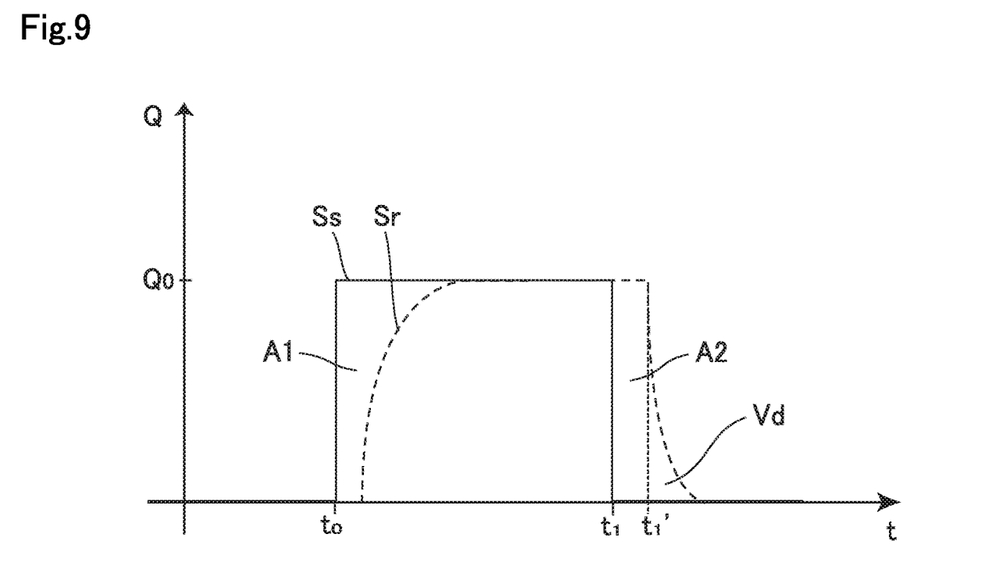
FIG. 9 is a diagram explaining an operation of the pulse flow rate control in another embodiment of the present invention.

FIG. 9 is a diagram for explaining the operation of the pulse flow rate control in another embodiment. In the embodiment shown in FIG. 9, when closing the control valve 6, the valve closing operation is performed by a first order lag control.

The first order lag control of the control valve 6 can be performed by lowering the flow rate value according to a predetermined exponential function. Further, as the predetermined exponential function used for the flow rate target value, compared with the pressure drop characteristic data Y(t) of the upstream pressure $P_1$ obtained in advance by measurement, an exponential function gentler than this (i.e., slope is small) is used.

More specifically, when the pressure drop characteristic data Y(t) is given by an exponential function with a time constant τ represented by $Y(t)=P_0*\exp(-t/\tau)$ where $P_0$ is the initial pressure, the control valve 6 is feedback controlled so as to comply to the target upstream pressure P(t) according to $P(t)=(P_0-P_x)*\exp(-t/\tau')+P_x$ (here, $P_x$ is the pressure corresponding to the flow target convergence value), as this point, the time constant τ' at P(t) is set to be greater than the time τ at Y(t), i.e. τ<τ'. As a result, the flow rate target value can be lowered in accordance with P(t), which is an exponential function slower than the pressure drop characteristic data Y(t). When the control valve 6 is completely closed and the flow rate becomes 0 as in the present embodiment, the above-mentioned $P_x$ is typically 0. In the present specification, the gentle function means that $|dP(t_1)/dt|<|dY(t_2)/dt|$ is satisfied with respect to $t_1$ and $t_2$ satisfying $P(t_1)=Y(t_2)$.

The pressure drop characteristic data Y(t), for example, is data showing the drop characteristics of the upstream pressure $P_1$ generated when the control valve 6 is rapidly closed from a state where the gas is flowing. The pressure drop characteristic data Y(t) can be obtained by plotting the upstream pressure $P_1$ as a function of time in the course of decreasing flow rate after the control valve 6 is closed. The initial control pressure at the time of obtaining the pressure drop characteristic data Y(t) is not limited to 100% but may be any pressure.

The pressure drop characteristic data Y(t) is strictly different data for each device. However, it has been found that almost the same characteristic data can be obtained with pressure type flow rate control devices manufactured with the same design (same volume between the control valve and the restriction part, same orifice diameter). Therefore, for the pressure-type flow rate control devices of the same design, it is also possible to use the common pressure drop characteristic data Y(t).

On the other hand, by using a sufficiently gentle exponential function for the pressure drop characteristic data Y(t) to ensure a margin capable of absorbing the characteristic difference of each device as a target value, it is also possible to apply the same exponential function control to a plurality of the same design devices.

When using the same common exponential function control for a plurality of pressure type flow rate control device, the pressure drop characteristic data Y(t) in each pressure type flow rate control device is previously acquired respectively, using the most gradual pressure drop characteristic data Y of the obtained pressure drop characteristic data Y(t) as a reference, a common target value P(t) may be set. The common target value P(t) is set to a slower exponential function than the slowest pressure drop characteristic data Y(t), and is set to a slower value than the pressure drop characteristic data Y(t) in the whole of the plurality of pressure type flow rate control devices. Therefore, in all of the plurality of pressure type flow rate control devices, the common target value P(t) becomes dominant, enables the elimination of differences in responsiveness between the devices, and performing equivalent flow rate control in a plurality of pressure-type flow rate control devices.

Figure 10:
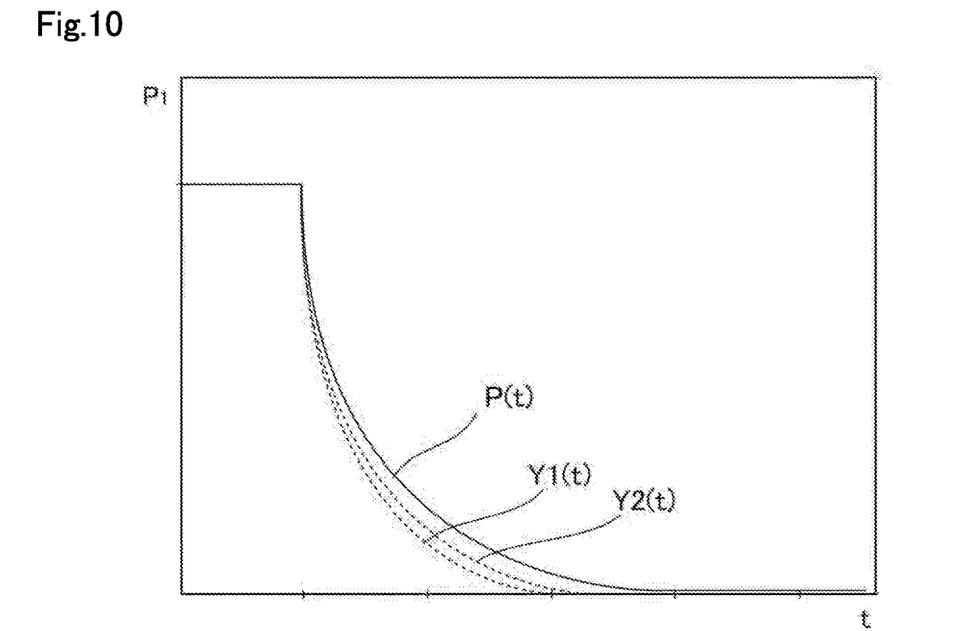
FIG. 10 is a diagram explaining a first order lag control at a time when the flow rate falls.

FIG. 10 shows a target value P(t) commonly set for a plurality of pressure drop characteristic data Y1 (t), Y2 (t). As can be seen from FIG. 10, by setting the target value P(t) gentler than the gentlest pressure drop characteristic data. Y2 (t), in a plurality of pressure type flow rate control devices, it is possible to perform equivalent flow rate control.

By performing the first order lag control as described above, it is possible to keep the flow rate drop characteristics in the flow rate fall period constant, and it is possible to perform the same flow rate fall operation without depending on the difference due to equipment (e.g., variations in the flow rate drop characteristics due to the occurrence of abnormal in the orifice, etc.). Thus, to suppress the variation in the integrated flow rate after the start of valve closing described above (known integrated flow rate Vd), also, since the difference between each device can be eliminated, stabled pulse flow rate control can be performed.

While embodiments of the present invention have been described above, various modifications are possible. For example, in the embodiment shown in FIGS. 4 and 5, together with calculating the target integrated flow rate Vs, valve opening/closing operation was performed so as to match the measured integrated flow rate (Vn+Vd) to the target integrated flow rate Vs, it is not limited thereto. In another embodiment of the present invention, the closing operation of the control valve 6 may be controlled by converging the integral flow rate difference, which is obtained by calculating the sum of the differences between the set flow rate signal Ss and the control flow rate signal Sr (i.e., the integrated flow rate difference) to 0.

More specifically, in the flow rate rise period, since the set flow rate signal Ss is larger than the control flow rate signal Sr, a positive difference corresponding to the area A1 shown in FIG. 9 occurs. On the other hand, at the time of falling, since the set flow rate signal Ss is reduced to 0 first, a negative difference corresponding to the area A2 shown in FIG. 9 occurs. Also, the known integrated flow rate Vd becomes a negative difference. Therefore, if the closing of the control valve 6 starts at a timing when the value obtained by adding the positive area A1, the negative area −A2 and the known integrated flow rate −Vd converged to 0, the integrated flow rate difference can be 0.

Figure 11:
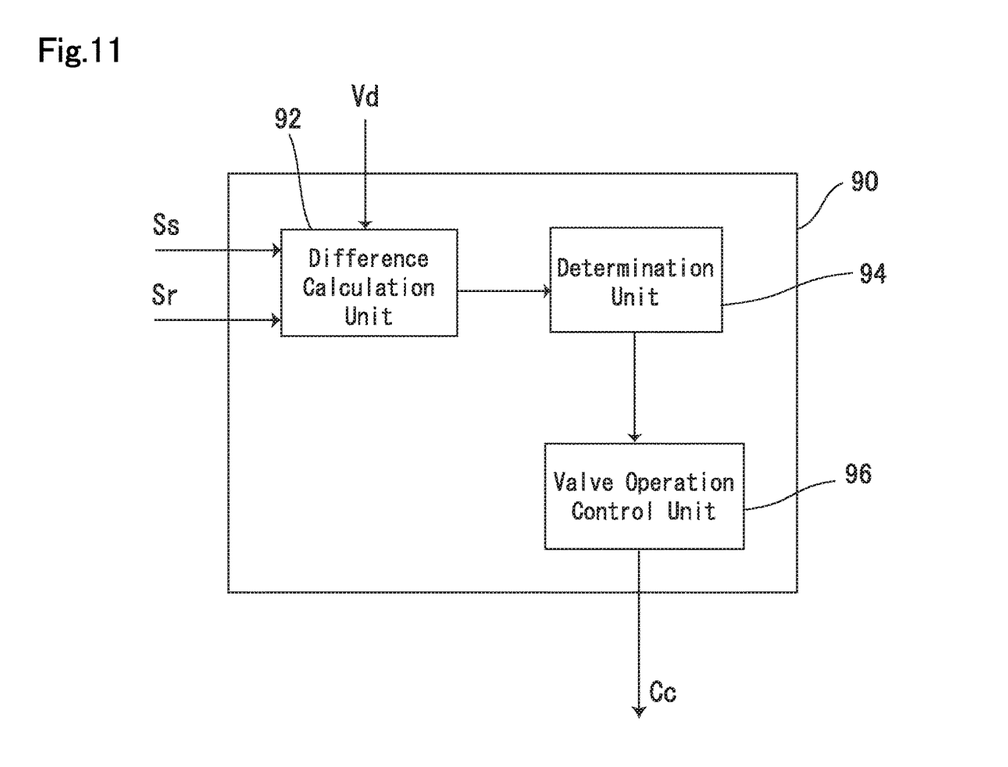
FIG. 11 is a block diagram showing an exemplary configuration of a controller for performing an operation of the pulse flow rate control in an embodiment of the present invention.

The above operation can be performed by, for example, a controller 90 shown in FIG. 11. The controller 90 includes a difference calculation unit 92 for calculating the integrated flow rate difference, that is the sum of the difference between the inputted set flow rate signal Ss and the control flow rate signal Sr output from the flow rate measurement unit, a determination unit 94 for determining whether or not the output of the difference calculation unit 92 converged within a predetermined range, and a valve operation control unit 96 for starting the closing operation of the control valve 6, when it is determined that the integral flow rate difference is converged within a predetermined range, by starting the closing operation of the control valve 6 so that the integral flow rate difference is substantially 0, it is possible to match the measurement integral flow rate to the target integral flow rate.

Further, although the known mode in which the integrated flow rate in the fall period has been described above, the embodiment of the present invention is not limited thereto. While measuring the control flow rate after the start of the valve closing, using the total arithmetic integral flow rate including the integral flow rate after the start of the valve closing (i.e., the arithmetic integral flow rate enlarged until the flow rate fall period), as a measurement integral flow rate that does not include the above known integral flow rate Vd, the operation of the control valve 6 may also be controlled so as to match the measured integral flow rate to the target integral flow rate.

For this purpose, for example, while starting the closing operation of the control valve at the timing when the difference between the target integral flow rate and the arithmetic integral flow rate reaches a predetermined threshold value, the valve closing operation can be controlled so that the subsequent integral flow rate matches the threshold value amount. In the case of performing the first-order lag control, by appropriately setting the time constant of the valve closing operation of the flow rate fall period, it is possible to match the measurement integrated flow rate to the target integrated flow rate, the time constant of the first order lag control may be changed in the middle of the flow rate fall period.

Further, an example of matching the measurement integral flow rate to the target integral flow rate by delaying the start timing of the closing of the control valve 6 has been described above, but it is not limited thereto. While setting the start timing of the closing of the control valve 6 as same as the set flow rate signal, the control of the closing operation of the control valve 6 may be performed so as to correspond to the target integrated flow rate. For example, based on the integral flow rate difference at the time of flow rate rising, by appropriately setting the coefficient of the lamp function of the flow rate fall period, or the time constant of the first order lag control, the measurement integral flow rate can be matched to the target integral flow rate.

Further, in the above, as the flow rate measurement unit, an example of using the upstream pressure sensor of the pressure-type flow rate control device is described, but it is not limited thereto. For example, even when the flow rate measurement unit in another embodiment, such as a thermal flow meter, is provided, together with obtaining the measurement integral flow rate based on the output of the flow rate measurement unit, by controlling the closing operation of the control valve so as to match to the target integral flow rate, it is possible to perform suitable pulse flow rate control that can supply the desired integral flow rate.

Furthermore, in the above, in order to match the measurement integral flow rate to the target integral flow rate, an aspect of controlling the timing of the closing operation of the control valve 6 in the flow rate fall period is explained. However, the flow rate control device of the present invention is not limited thereto, and may be configured such that the gas can be flowed at the integrated flow rate corresponding to the target integrated flow rate in the flow rate rise period, that is, in the period from the flow rate 0 to the set flow rate $Q_0$. An exemplary aspect of compensating for the integrated flow rate during the flow rise period is described below.

Figure 12:
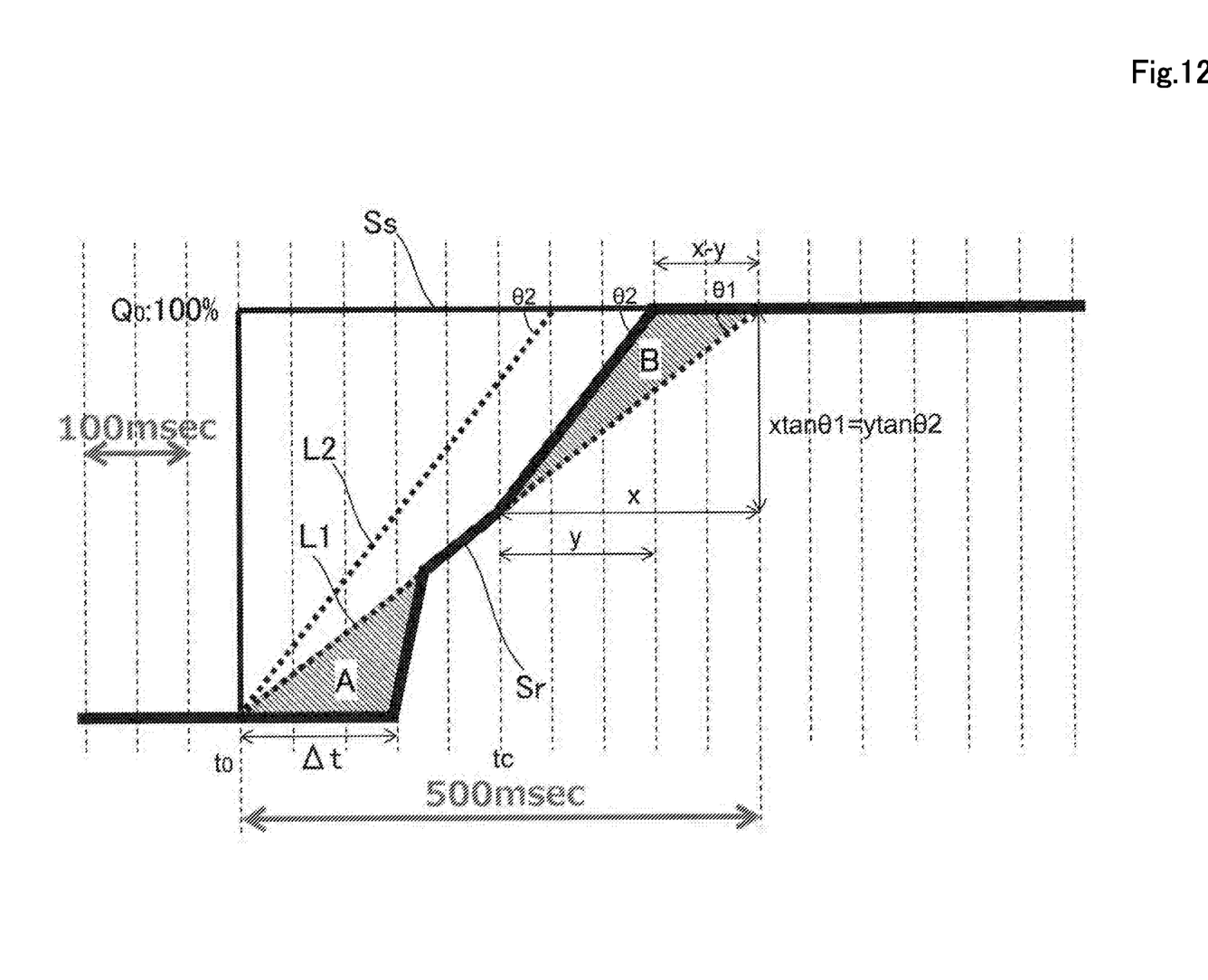
FIG. 12 is a diagram explaining the flow rate control in a flow rate rise period in another embodiment of the present invention.

FIG. 12 is a diagram showing a set flow rate signal (flow rate input signal) Ss in the flow rate rise period, and a control flow rate signal Sr (flow rate output signal) realized in the present embodiment. As described above, even in the present embodiment, the set flow rate signal Ss is given to the flow rate control device 100 as a rectangular wave signal to increase the flow rate from 0 to the set flow rate $Q_0$ at time $t_0$.

However, in the present embodiment, a ramp control is performed in the flow rate rise period. More specifically, upon receiving the set flow rate signal Ss, the flow rate control device 100 generates an internal command signal (broken line L1) for linearly increasing the flow rate to the set flow rate $Q_0$ (here, 100% flow rate) over a time period of 500 msec from time $t_0$, and performs an operation of gradually opening the control valve 16 in accordance with the internal command signal. This is because, in the present embodiment, since performing the area control to match the target integral flow rate (control of the volume of the supplied gas), even if the ramp control is performed at the rising time, the integral flow rate can be controlled to match the desired integral flow rate, and the suitable gas supply can be implemented.

By performing such a ramp control, since the increase of the sudden gas supply in the rise period is prevented, it is possible to suppress the occurrence of overshoot. However, when the ramp control inclination is steep, since overshoot may still occur, it is preferable to perform the ramp control below the upper limit slope set in advance. In the present embodiment, the slope where the rise reaches 100% flow rate at 300 msec (slope of the broken line L2) is set as the upper limit slope. However, when overshoot occurs, since the slope varies depending on the set flow rate, which is the target value, and the characteristics of the device, it is needless to say that the slope is not limited to the 300 msec, but may be any slope. Further, the slope of the ramp control is not limited to the slope where the flow rate rise to 100% flow rate at 500 msec as described above, it is needless to say that it may be any slope or any set flow rate.

Further, when performing the ramp control, as shown in FIG. 12, ideally, the flow rate rise is performed from time $t_0$ as shown by the broken line L1. In this case, rather than the integral flow rate required by the set flow rate signal Ss of the rectangular wave, insufficiency occurs in the integral flow rate (gas volume) of the triangular area (Q0×500 msec/2). However, this shortage is an amount obtained in advance, and therefore can be easily compensated by a method, such as delaying the flow rate fall time, as described above.

However, in practice, even when performing the ramp control, as the control flow rate signal Sr of FIG. 12 (flow rate output signal) is shown, a delay in the opening of the control valve 6 occurs, a certain amount of delay time Δt from the time $t_0$ has elapsed before the flow rate rises. In the example shown, a delay of about 150 msec occurs. Therefore, in practice, the supply amount is smaller than the desired integrated flow rate, which is supposed to be supplied by the ramp control. The insufficient integral flow rate corresponds to the triangle area A shown in FIG. 12.

Therefore, in the present embodiment, in the flow rate rise period, a difference between the internal control signal corresponding to the ramp control (signal indicated by the broken line L1), and the control flow rate signal Sr, i.e. the area A (integral flow rate difference) is obtained by measurement of the flow rate measurement unit, so as to compensate the shortage of the area A portion. More specifically, from the middle of the flow rate rising, change the coefficient of the ramp control (slope), from the slope of the broken line L1 (first slope) to the slope of the broken line L2 (second slope), and increase the amount of gas supply by only the amount of area B shown in FIG. 12. Further, as the slope of the ramp control after change, a slope of 300 msec, that is the upper limit of the slope when overshoot does not occur, is employed. In addition, the area A, specifically, in the difference calculation unit 92 shown in FIG. 11, can be determined by inputting the internal control signal (ramp control signal) instead of the set flow rate signal Ss, and calculating the integrated flow rate difference, that is the sum of the differences.

When performing the above operation, if the area A and the area B are the same, the same amount of gas is supplied, as the amount when gas has been supplied until it reaches the target flow rate without delay of the valve opening of the control valve 6 in accordance with the ramp control. Here, the area A can be determined by the integrated value of the difference between the output signal of the actual flow rate measured using the flow rate measurement unit and the internal command signal (integral flow rate difference). In order to compensate for the amount of the deficiency, the inclination of the ramp control may be changed to match the area B to the area A, but when the inclination before the change and the inclination after the change are determined in advance, the time tc, at which the inclination is changed, for example, may be determined as follows.

As shown in FIG. 12, if setting the slope when 500 msec is reached as θ1, and the slope when 300 msec is reached as θ2, the period x and the period y shown in FIG. 12 satisfy the relation of y=x(tan θ1/tan θ2). The area B can be expressed as B=(1/2)×(x−y)×x·tan θ1.

Here, when B=A is satisfied, $2B=2A=x^2 \times(1-\tan \theta 1/\tan \theta 2) \times \tan \theta 1$ is derived using y=x(tan θ1/tan θ2), and transformed to x=√(2A)/(1−tan θ1/tan θ2)tan θ1). Then, all others are constant except A, when the constant C=√2/((1−tan θ1/tan θ2)×tan θ1), it can be expressed as x=C×√A. Therefore, the switching time tc satisfying A=B is given by tc=500−C×√(A) when the time $t_0$ is 0, that is, tc can be determined based on the measurement result of A.

At time tc thus determined, by changing the slope of the ramp control from the slope θ1 of 500 msec to the slope θ2 of 300 msec, it is possible to supply the gas at a desired integrated flow rate.

However, in another embodiment, in order to compensate for the deficiency of the area A, the slope of the ramp control after the change may be determined based on the measured area A. In this case, by fixing the time tc of changing the inclination, and together with appropriately selecting the inclination corresponding to the area A, the area A and the area B can be made the same. However, in order to prevent the occurrence of overshoot, it is preferable to set the inclination after change to the upper limit inclination (here, an inclination of 300 msec) or less.

INDUSTRIAL APPLICABILITY

The flow rate control device and the flow rate control method according to the embodiments of the present invention can be used, for example, in a semiconductor manufacturing equipment, a chemical plant, or the like, and in particular, can be suitably used in an application that pulse flow rate control is required.

DESCRIPTION OF NUMERICALS

1 Flow path
2 Restriction part
3 Upstream pressure sensor
4 Downstream pressure sensor
5 Temperature sensor
6 Control valve
7 Controller
9 Downstream valve
10 Process chamber
11 Vacuum pump
12 External control device
70 Controller
72 Calculation unit
74 Comparison unit
76 Valve operation control unit
100 Flow rate control device
Cc Closing command
Sr Control flow rate signal
Ss Set flow rate signal
Vd Known integral flow rate
Vn Arithmetic integral flow rate
Vs Target integral flow rate

The invention claimed is:

1. A flow rate control device comprising:
   a control valve provided in a flow path;
   a flow rate measurement unit for measuring a flow rate of a fluid controlled by the control valve; and
   a controller,
   wherein the controller controls the opening/closing operation of the control valve, to match a measured integral flow rate obtained based on a signal output from the flow rate measurement unit to a target integral flow rate for a pulsed gas supply, and
   wherein the measured integral flow rate includes an arithmetic integral flow rate obtained from the signal output from the flow rate measurement unit and a predetermined integral flow rate in a flow rate fall period after closing the control valve obtained before the pulsed gas supply.

2. The flow rate control device according to claim 1, wherein the controller is configured to start the closing of the control valve at a timing when the arithmetic integral flow rate has reached the value obtained by subtracting the predetermined integral flow rate from the target integral flow rate.

3. The flow rate control device according to claim 1, wherein the flow rate measurement unit includes a restriction part provided downstream side of the control valve and a pressure sensor for sensing a pressure between the control valve and the restriction part, the flow rate measurement unit being configured to measure the flow rate of the downstream side of the restriction part based on the output of the pressure sensor.

4. The flow rate control device according to claim 1, wherein the closing of the control valve is performed by a first order lag control.

5. The flow rate control device according to claim 1, wherein the control valve is a normally closed type piezoelectric element driven valve.

6. The flow rate control device according to claim 1, wherein a continuous pulse signal of rectangular waves is input to the controller as a set flow rate signal.

7. A flow rate control method of a flow rate control device including a control valve provided in a flow path and a flow rate measurement unit for measuring a flow rate of a fluid controlled by the control valve, the method comprising a step of starting the closing of the control valve at a timing when an arithmetic integral flow rate determined from the signal output from the flow rate measurement unit reaches to a value obtained by subtracting a known integral flow rate during the flow rate fall period after closing the control valve from a target integral flow rate.

\* \* \* \* \*